(12) United States Patent
Lambert et al.

(10) Patent No.: US 11,854,076 B2
(45) Date of Patent: Dec. 26, 2023

(54) SPECIALIZED CALCULATOR WITH GRAPHICAL ELEMENT AND USER INTERFACES

(71) Applicant: MTL Ventures LLC, Tarpon Springs, FL (US)

(72) Inventors: Mark Thomas Lambert, Tarpon Springs, FL (US); Jon Voss, Bannockburn, IL (US)

(73) Assignee: MTL Ventures LLC, Tarpon Springs, FL (US)

( * ) Notice: Subject to any disclaimer, the term of this patent is extended or adjusted under 35 U.S.C. 154(b) by 0 days.

(21) Appl. No.: 17/344,915

(22) Filed: Jun. 10, 2021

(65) Prior Publication Data
US 2021/0304305 A1   Sep. 30, 2021

Related U.S. Application Data

(62) Division of application No. 15/464,032, filed on Mar. 20, 2017, now abandoned.

(51) Int. Cl.
*G06Q 40/03* (2023.01)
*G06F 40/177* (2020.01)

(52) U.S. Cl.
CPC .......... *G06Q 40/03* (2023.01); *G06F 40/177* (2020.01)

(58) Field of Classification Search
None
See application file for complete search history.

(56) References Cited

U.S. PATENT DOCUMENTS

| | | | |
|---|---|---|---|
| 6,944,638 B1 | 9/2005 | Putnam | |
| 6,978,286 B2 | 12/2005 | Francis et al. | |
| 7,899,854 B1 | 3/2011 | Fakharzadeh | |
| 8,832,588 B1* | 9/2014 | Kerzner | G06F 3/0481 715/764 |
| 10,409,906 B1 | 9/2019 | Wilson | |
| 2008/0082938 A1* | 4/2008 | Buczek | G06F 40/18 715/227 |
| 2009/0262068 A1 | 10/2009 | Alberte, Jr. | |
| 2010/0030676 A1* | 2/2010 | de Brebisson | G06Q 40/02 705/35 |
| 2011/0173076 A1* | 7/2011 | Eggleston | G06Q 30/0611 705/14.66 |
| 2012/0116983 A1* | 5/2012 | Mak | G06Q 50/163 705/314 |
| 2013/0061122 A1 | 3/2013 | Sethi et al. | |

(Continued)

OTHER PUBLICATIONS

"Secondary Participation Guaranty Agreement, www.sba.gov/sites/default/files/SBA%20FORM%201086.pdf, Jan. 25, 2017" (Year: 2017).*

(Continued)

*Primary Examiner* — Kito R Robinson
*Assistant Examiner* — Toan Duc Bui
(74) *Attorney, Agent, or Firm* — Cook Alex Ltd.

(57) ABSTRACT

A specialized mortgage constant calculator may include at least four different modes, each mode associated with a graphical user interface tailored to the mode and displayed on an electronic display. In addition, the mortgage constant calculator may include an adjustable table with a persistent, adjustable frame of reference and other navigational tools that facilitate use of a table that may be far larger than a display area of the electronic display.

10 Claims, 8 Drawing Sheets

(56) References Cited

U.S. PATENT DOCUMENTS

| | | | |
|---|---|---|---|
| 2013/0151938 A1* | 6/2013 | Waldman | G06F 16/958 715/210 |
| 2014/0136986 A1 | 5/2014 | Martin et al. | |
| 2015/0206218 A1* | 7/2015 | Banerjee | G06Q 30/0623 705/26.61 |
| 2018/0075388 A1* | 3/2018 | Rosebrock | G06Q 40/06 |
| 2018/0181263 A1 | 6/2018 | Mathias et al. | |

OTHER PUBLICATIONS

"Calculate Stuff, www.calculatestuff.com/financial/mortgage-calculator, Nov. 11, 2016" (Year: 2016).*

"Sample templates, www.sampletemplates.com/business-templates/loan-amortization-calculator.html, Jun. 15, 2016" (Year: 2016).*

"Time Value of Money—Six Functions of a Dollar, California State Board of Equalization, Dec. 19, 2013" (Year: 2013).*

"Sample Loan Amortization Calculator Template, Sample Loan Template, Jun. 15, 2016" (Year: 2016).*

ExcelVbaIsFun, Excel VBA Tips n Tricks #17 Highlight Selected Row or Column, published on Youtube.com, https://www.youtube.com/watch?v=jm6wID5tsgs, (Apr. 20, 2013).

Youtube Video entitled "Excel VBA Tips n Tricks #17 Highlight Selected Row or Column", Published on Youtube.com, https://www.youtube.com/watch?v=jm6wID5tsgs (Apr. 20, 2013).

Chandoo, "Highlight CellHighlight Row & Column of Selected Cellusing VBAusing VBA", Chandoo.org, published Jul. 11, 2012, available at: https://chandoo.org/wp/highlight-row-column-of selected-cell-using-vba/.

Tracey, Philip "Highlight Selected Cells in Excel and Preserve Cell Formatting", MyOnlineTrainingHub.com, published May 20, 2015, available at: https://www.myonlinetraininghub.com/highlight-selected-cells-in-excell-and-preserve-cell-formatting.

Harkins, Susan, "How to highlight the active row, column or both using VBA and conditionalformating," TechRepublic.com, published Mar. 24, 2014, available at: https://www.techrepublic.com/article/pro-tip-highlight-the-active-row-column-or-both-using-vba-and-conditional-formatting/.

\* cited by examiner

SPECIALIZED CALCULATOR WITH GRAPHICAL ELEMENT AND USER INTERFACES

This application is a divisional of U.S. patent application Ser. No. 15/464,032, filed Mar. 20, 2017, which is hereby incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This patent is directed to a specialized calculator, and in particular to a specialized calculator with a graphical element and several modes of calculation.

In commercial real estate development, mortgage constants are used to evaluate how much rent is needed or desirable for a given amount of investment cost. For example, If a developer borrows money at 5% and obtains a 25-year amortization period on a 30/360 interest calculation basis (i.e., thirty days per month, 360 days per year), the mortgage constant is 7.02%. If the total cost of the investment is $1,000,000, the developer seeks a return greater than 7.02% to yield positive leverage. It is also possible to obtain a return less than this amount (i.e., negative leverage) or equal to this amount (neutral leverage).

The determination whether there is positive, neutral or negative leverage for a given development is not a simple matter. As one example, assume the developer can obtain an 8% return on the $1,000,000 total cost, the base rent would be $80,000. If the developer can borrow 75% of the total cost (or $750,000) on the terms specified above, the annual mortgage payment would be 7.02%×$750,000, or $54,000. After borrowing $750,000, the equity investment is $250,000, and the return on the equity investment is equal to $80,000−$54,000, or $26,000. If the return on investment is divided by $250,000, the result is 10.4%—which is greater than 7.02%, or a positive leverage.

Most commercial developers will make use a mortgage constant chart to facilitate their calculations. The mortgage constant is a ratio between the annual debt service divided by the original loan amount. The mortgage constant is only applicable to mortgages that pay a fixed rate. This chart, which is typically in excess of one or more sheets of letter sized paper, is often much larger than the developer will require to perform daily calculations, although the developer may occasionally refer to regions of the chart that he or she has not referred to over a long period of time. Further, considering the size of the chart, is not uncommon to lose one's position within the chart.

Furthermore, the chart only facilitates certain calculations. Other calculations, relevant to the determination of the leverage of a development may need to be performed as well. Over time, the developer may perform these calculations frequently enough that they prepare additional sheets with such calculations already performed for a particular region of the mortgage constant chart. However, these ancillary sheets are dependent on the region of the mortgage constant chart selected, and so the developer will have to perform the calculations if his or her interest changes to a different part of the mortgage constant chart.

Consequently, it is desired to have alternative apparatuses and methods for the traditional method utilizing a mortgage constant chart.

SUMMARY

According to an aspect, a portable specialized mortgage constant calculator includes an electronic display, at least one processor coupled to the electronic display, and at least one input coupled to the processor to provide one or more user inputs. The at least one processor is programmed to provide at least four different modes, each mode associated with a graphical user interface tailored to the mode and displayed on the electronic display. A first mode for calculation of a payment includes a graphical user interface including a loan amount input, an amortization period input, and an interest rate input and a payment output. A second mode for calculation of a mortgage constant includes a graphical user interface including an interest rate input and an amortization period input, and a mortgage constant output. A third mode for calculation of an interest rate includes a graphical user interface including an amortization period input and a mortgage constant input, and an interest rate output. A fourth mode for calculation of a period includes a graphical user interface including an interest rate input and a mortgage constant input, and an amortization period output.

According to a further aspect, a portable specialized mortgage constant calculator includes an electronic display, at least one processor coupled to the electronic display, and at least one input coupled to the processor to provide one or more user inputs. The at least one processor is configured to provide at least four different modes, each mode associated with a graphical user interface tailored to the mode and displayed on the electronic display. A first mode for calculation of a payment includes a graphical user interface including a loan amount input, an amortization period input, and an interest rate input and a payment output, a mortgage constant output, and an effective annual interest rate output. A second mode for calculation of a mortgage constant includes a graphical user interface including an interest rate input and an amortization period input, and a mortgage constant output. A third mode for calculation of an interest rate includes a graphical user interface including an amortization period input and a mortgage constant input, and an interest rate output. A fourth mode for calculation of a period includes a graphical user interface including an interest rate input and a mortgage constant input, and an amortization period output.

According to a still further aspect, a portable specialized mortgage constant calculator includes an electronic display, at least one processor coupled to the electronic display, and at least one input coupled to the processor to provide one or more user inputs. The at least one processor is programmed to control the electronic display to display an adjustable table with an adjustable, persistent frame of reference. The adjustable table and adjustable frame of reference include a graphical element comprising a plurality of cells arranged in a plurality of rows and a plurality of columns, each of the cells containing a numeric or alphanumeric character, and a moveable window in which an area of the graphical element is visible, the window being moveable relative to the rows and columns of the graphical element to display a different range of rows, a different range of columns or a different range of rows and a different range of columns on the electronic display in response to a first user input. The adjustable table and adjustable frame of reference also include a first graphical user interface comprising a first control to select only a cell of interest from the plurality of cells, a row highlight responsive to the first control to maintain selection of a first row from the plurality of rows, the row comprising the cell, and a column highlight responsive to the first control to maintain selection of a first column from the plurality of columns, the column comprising the cell, the row highlight and column highlight being visible in the moveable window when any cell in the first row or the first column is visible within the moveable window; and a second graphical user interface comprising a second control to select a range of the rows and a range of the columns of the graphical element to define a subset with a subset area smaller than a total area of the graphical element, the processor programmed to display the subset on the electronic display and to discontinue the moveable window if the subset area is smaller than the moveable window.

BRIEF DESCRIPTION OF THE DRAWINGS

The disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

FIG. 5 is a graphical user interface for a second mode of the specialized calculator;

FIG. 6 is a graphical user interface for a third mode of the specialized calculator; and FIG. 7 is a graphical user interface for a fourth mode of the specialized calculator

DETAILED DESCRIPTION OF VARIOUS EMBODIMENTS

Figure 1:
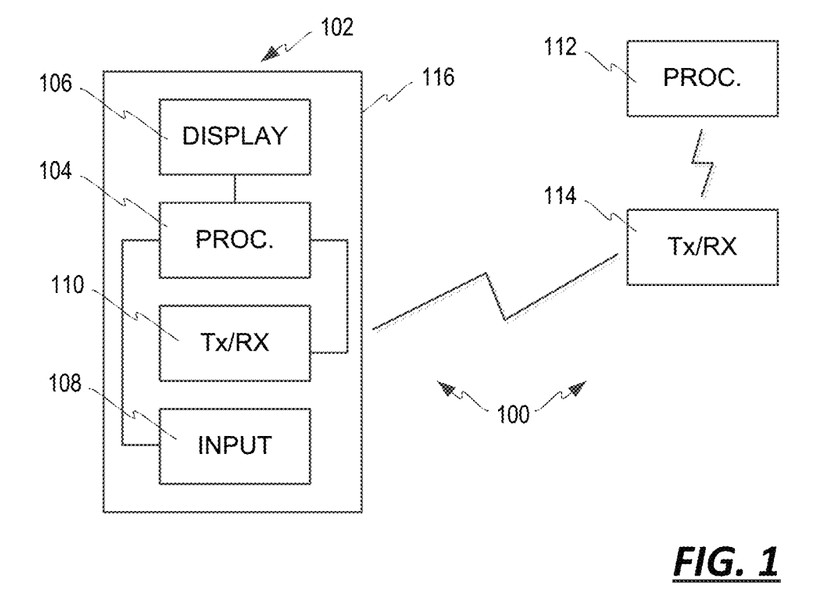
FIG. 1 is a block diagram of an exemplary device and system on which to implement an embodiment of a specialized calculator.

Referring first to FIG. 1, the system 100 may include a device or an apparatus 102 may include a processor or microprocessor 104 (which, in fact may include multiple physical and/or virtual processors). According to other embodiments, the processor 104 may include one or more electrical circuits designed to carry out the actions described herein. In fact, the processor 104 may include a microprocessor and other circuits or circuitry. In addition, the processor 104 may include one or more memories. The instructions by which the processor 104 is programmed may be stored on the memory associated with the processor 104, which memory/memories may include one or more tangible non-transitory computer readable memories, having computer executable instructions stored thereon, which when executed by the processor 104 (or more particularly, the microprocessor), may cause the processor 104 to carry out one or more actions of the methods described below. More generally speaking so as to include embodiments wherein the processor 104 includes (or only includes) electrical circuits or circuitry, the processor 104 may be configured to carry out the actions that a microprocessor-based processor 104 would be programmed to carry out.

As is also illustrated in FIG. 1, the processor 104 may be coupled to one or more devices, for example to receive information (e.g., in the form of signals) from these devices or to provide commands (e.g., in the form of signals) to these devices to control the operation of the apparatus 102. The processor 104 may be directly electrically connected to these structures to be coupled to them, or the processor 104 may be directly connected to other intermediate equipment that is directly connected to these structures so as to be coupled to them.

For example, the processor 104 is coupled to an electronic display 106 and at least one input 108 to provide one or more user inputs to the processor 104. The electronic display 106 may be in the form of an electronic video (or visual) display, such as a liquid crystal display (LCD) or a light emitting diode (LED) display (for example, an organic light emitting diode (OLED) display). The at least one input 108 may include a number of different devices according to the embodiments described herein. For example, the input 108 could include a keyboard or keypad by which a user may provide information and/or instructions to the processor 104. Alternatively, the input 108 may be a touch screen (e.g., resistive or capacitive touchscreen), such as may be used in conjunction with the electronic display 106. The assembly of the input/touch screen 108 and video display 106 may be one of the afore-mentioned structures to which the processor 104 is coupled from which the processor 104 receives information and to which the processor 104 provides commands. The input 108 could also include a camera, reader or scanner, such as a barcode reader or scanner or an RFID reader.

The device 102 may also include equipment 110 that permits the device 102 including the processor 104 to communicate (whether via wires, cables, etc. or wirelessly) with one or more other processors 112 over a local network, a wide area network, or the Internet (and potentially via a cellular network in combination with or in the alternative). As to the structure and operation of these processors 112 (which may be referred to as remote processors), the discussion relative to processor 104 (which may be referred to as a local processor) may be generally applicable as to their structure and operation. According to such an embodiment, the equipment 110 may include an internal transmitter/receiver device (which may in the form of a transceiver, or separate transmitter and receiver). Moreover, the other processors 112 may be coupled, either directly or indirectly, to a transmitter/receiver device 114. The system 100 may utilize one or more of the processors 104, 112 in providing the portable specialized mortgage constant calculator according to the illustrated embodiments.

According to certain embodiments, the processor(s) 112 may perform certain of the activities of the system 100. For example, the processor(s) 112 may perform certain calculations instead of the processor 104, and the processor 104 may remain responsible for the control of the display 106 to permit the results of those calculations to be displayed to the user. According to other embodiments, the processor(s) 112 may be responsible for downloading instructions (in the form of software or firmware, for example) to the processor 104, which instructions are executable by the processor 104 to carry out the actions of the methods described herein. According to still other embodiments, the processors 112 may be responsible both for performing parts of the methods described herein and for downloading instructions to the processor 104.

As a final note, the processor 104, display 106, at least one input 108, and transmitter/receiver device 114 may be disposed in or mounted on a housing 116 to define a hand-held device. According to certain embodiments, the hand-held device may be mobile or cellular device, such as a smart phone or tablet. The apparatus 102 is not limited to such embodiments, unless specifically recited as such. For example, the apparatus 102 may also be a desktop or laptop computer, although it will be appreciated that a desktop or laptop computer may include the display 106, input 108 (e.g., keyboard/pad or touch screen), and transmitter/receiver 114 similar to the hand-held device described above.

Figure 2:
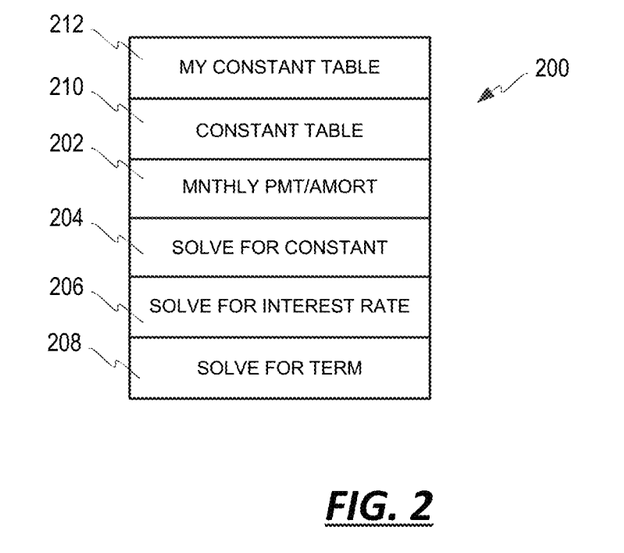
FIG. 2 is a simulated screenshot of a first graphic user interface for selecting between various modes of the specialized calculator.

The processor 104 is programmed to provide at least four different modes, each mode associated with a graphical user interface tailored to the mode and displayed on the electronic display. FIG. 2 illustrates a graphical user interface 200, in the form of a menu, that permits the user, for example utilizing the input 108, to select one of four modes: monthly payment mode, mortgage constant mode, interest rate mode, and amortization period mode. Each of the modes is associated with an area 202, 204, 206, 208 of the interface 200 to permit the user to use the input 108 to select that mode. The menu may have other areas 210, 212 that are associated with additional modes or graphical user interfaces, as will be discussed below.

According to certain embodiments of the system 100, once the user has selected or accessed one of the four modes or the graphical user interfaces using the graphical user interface 200, the system 100 will ensure that the user will return to that mode or graphical user interface if the program is exited and then subsequently activated. For example, if the user activates the program, uses the interface 200 to access the monthly payment mode, and then exits the program, the system 100 will enter the monthly payment mode upon subsequent activation of the program. The state information for the program may be stored locally (e.g., at the local processor 104), may be stored remotely (e.g., at the remote processor 112) or both. According to other embodiments of the system 100, the user may be directed to the graphical user interface 200 each time the user activates the program.

Figure 3:
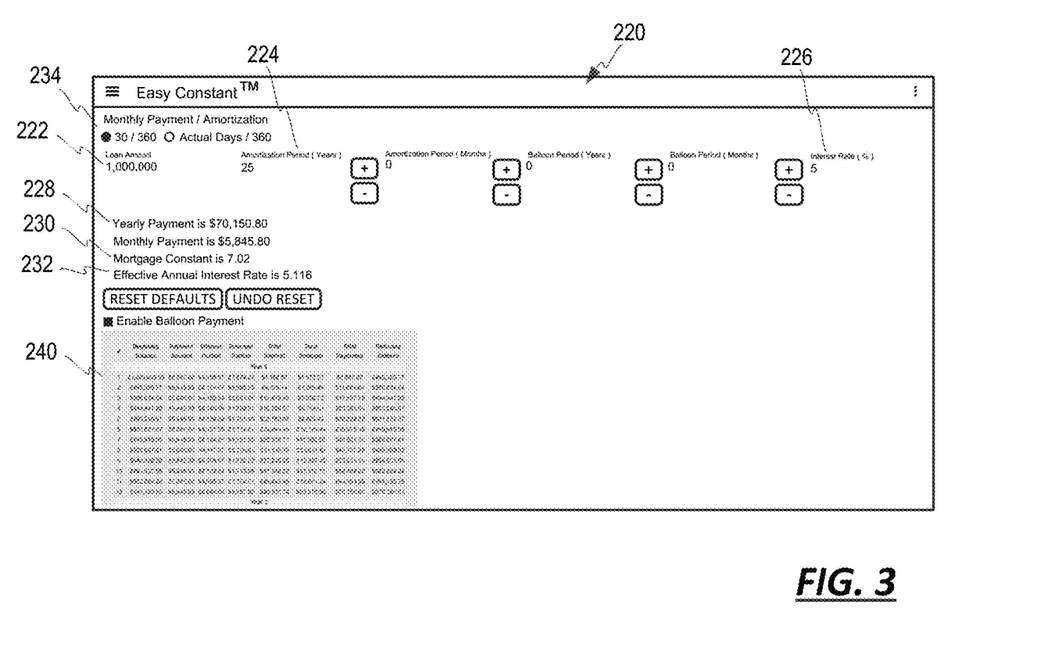
FIG. 3 is a graphical user interface for a first mode of the specialized calculator.

FIG. 3 illustrates a graphical user interface 220 associated with the first mode for calculation of a payment. The graphical user interface 220 includes a loan amount input 222, an amortization period input 224, and an interest rate input 226 and a payment output 228 (in yearly or monthly format), a mortgage constant output 230, and an effective annual interest rate output 232. The graphical user interface 220 permits the processor 104 to receive only the data necessary to calculate a payment amount, and to provide that payment amount to the user at the output 228. According to certain embodiments, the graphical user interface 220 may include only those inputs and outputs mentioned above. Once the processor 104 has received the inputs, the processor 104 may then perform a calculation using the values of each of the inputs, or may consult a lookup table formatted using the three inputs listed above.

The monthly payment mode, as well as that of each of the modes described below, includes a first calculation mode on a 30/360 basis and a second calculation mode on an actual days/360 basis. Consequently, the graphical user interface 220, and the graphical user interfaces of each of the additional modes discussed, comprises a calculation mode input 234 to select between the first and second calculation modes.

For example, the monthly payment may be calculated according to one of the following equations:

$$(P*\text{INT})/(12*(1-((1+(\text{INT}/12))\hat{\ }(-T)))), \text{ if } 30/360 \quad \text{(eqn. 1)}$$

$$(P*\text{INT})/(11.8275154004*(1-((1+(\text{INT}/11.8275154004))\hat{\ }(-T)))), \text{ if actual}/360 \quad \text{(eqn. 2)}$$

where P=principal (in dollars)
INT=interest rate (in decimal format; e.g. 0.01); and
T=time (in months).

As a further example, the mortgage constant may be calculated according to one of the following equations:

$$\text{INT}/(1-(1/((1+(\text{INT}/12))\hat{\ }T))), \text{ if } 30/360 \quad \text{(eqn. 3)}$$

$$(\text{INT}/(11.8275154004*(1-((1+(\text{INT}/11.8275154004))\hat{\ }(-T)))))*12, \text{ if actual}/360 \quad \text{(eqn. 4)}$$

where INT=interest rate (in decimal format; e.g. 0.01); and
T=time (in months).

In addition, the effective annual interest rate may be calculated according to one of the following equations:

$$((1+(\text{INT}/12))\hat{\ }12)-1, \text{ if } 30/360 \quad \text{(eqn. 5)}$$

$$((1+(\text{INT}/11.8275154004))\hat{\ }11.8275154004)-1, \text{ if actual}/360 \quad \text{(eqn. 6)}$$

where INT=interest rate (in decimal format; e.g. 0.01).

Figure 4:
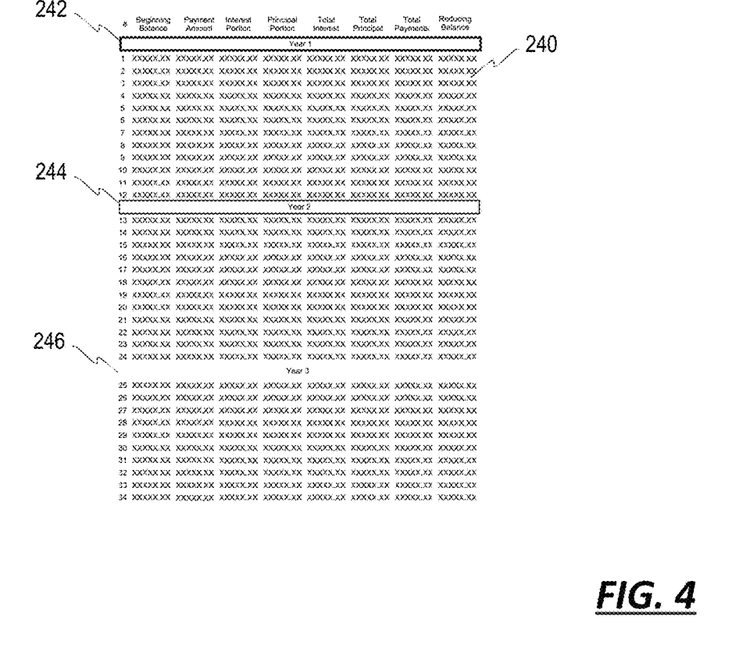
FIG. 4 is a simulated screenshot of a graphical element included as part of the graphical user interface for the first mode of the specialized calculator, the graphical element including a variable highlight.

The graphical user interface 220 may also include a graphical element 240, which is shown in part in FIG. 3 and in further detail in FIG. 4. The graphical element 240 includes additional information on the payment output, illustrated at 228, such as the total payment amount, the portion of the payment amount attributable to interest, the portion of the payment amount attributable to principal repayment, the total interest paid to specific point in time, the total principal paid to a specific point in time, and the total payments made to a specific point in time. The graphical element 240, which may be in tabular form, may also indicate the balance of the loan amount at the beginning of the specific point in time and after the loan payment has been made. As illustrated in FIGS. 3 and 4, the graphical element 240 may be divided into a plurality of time increments such as years (starting with the year of the first payment), and further subdivided into months. In fact, certain embodiments of the graphical element 240 may include odd days of the month depending on start or end of payments.

The graphical element 240 may have a plurality of header rows 242, 244, 246 that separate the table into sections or segments, each section or segment representing a different period of time. As noted above, the graphical element 240 may be divided into years, and each year may be associated with a different one of the header rows 242, 244, 246. While three header rows 242, 244, 246 have been illustrated in FIG. 4, it will be recognized that the number of header rows in a particular embodiment may be more or less than the number illustrated in FIG. 4. For example, as noted in FIG. 3, the term of the loan is 25 years. In such a circumstance, one would expect the graphical element 240 to include at least 22 header rows in addition to those illustrated in FIG. 4, which additional header rows are not illustrated for simplicity sake in FIG. 4.

As will be recognized in FIG. 4, the header rows 242, 244, 246 may vary as to some characteristic so that the user may more easily navigate the material included in the graphical element 240. For example, as illustrated, the header rows 242, 244, 246 may vary as to the shading or highlighting used with the rows 242, 244, 246, with each of the rows 242, 244, 246 having a different level of shading or highlighting when compared with the preceding and succeeding row 242, 244, 246. Alternatively, the shading of the background may be varied such that the shading of at least one of the rows 242, 244, 246 provides a more noticeable contrast to the shading of the background. As a further alternative, the rows 242, 244, 246 may have a border of varying thickness, or the characters included in the row 242, 244, 246 may have varying degrees of boldness. As a further option, varying colors may be used for each of the rows 242, 244, 246. Still other options are possible as well.

The intent is for the user to be able to move the portion of the graphical element 240 that is visible. As the graphical element 240 moves relative to the area that is visible (e.g., scrolls up or scrolls down), the characteristic differences between the rows 242, 244, 246 may vary so that the user's vision is drawn to the section that is displayed in a particular region of the visible area of the display 106. That is, the highlighting of the header rows 242, 244, 246 varies with movement of the header rows 242, 244, 246. For example, the row 242, 244, 246 closest to the top of the display 106 may be the row that is most brightly highlighted (or in starkest contrast to the background), as illustrated in FIG. 4. Alternatively, it might be the row that is in the middle of the visible display, or closest to the bottom of the display 106.

FIG. 5 illustrates a graphical user interface 250 associated with a second mode for calculation of a mortgage constant. The graphical user interface 250 includes an interest rate input 252 and an amortization period input 254, and a mortgage constant output 256. It also includes the calculation mode input 234. According to certain embodiments, the graphical user interface 250 may include only those inputs and outputs mentioned above. Once the processor 104 has received the inputs, the processor 104 may perform a calculation, or may consult a lookup table to determine the mortgage constant. For example, the mortgage constant may be calculated according to one of the following equations:

$$INT/(1-(1/((1+(INT/12))^T))), \text{ if } 30/360 \qquad (\text{eqn. 7})$$

$$(INT/11.8275154004*(1-((1+(INT/11.8275154004))^{(-T)})))*12, \text{ if actual}/360 \qquad (\text{eqn. 8})$$

where INT=interest rate (in decimal format; e.g., 0.01); and
T=time (in months).

FIG. 6 illustrates a graphical user interface 270 associated with a third mode for calculation of an interest rate. The graphical user interface 270 includes an amortization period input 272 and a mortgage constant input 274, and an interest rate output 276. It also includes the calculation mode input 234. According to certain embodiments, the graphical user interface 270 may include only those inputs and outputs mentioned above. Once the processor 104 has received the inputs, the processor 104 may consult a lookup table to determine the interest rate. Because the lookup table is established using discrete values of amortization period and mortgage constant, it may be necessary to interpolate between values within the lookup table and/or iterate through the lookup table to determine the value at the interest rate output.

FIG. 7 illustrates a graphical user interface 290 associated with a fourth mode for calculation of a period. The graphical user interface 290 includes an interest rate input 292 and a mortgage constant input 294, and an amortization period output 296. It also includes the calculation mode input 234. According to certain embodiments, the graphical user interface 290 may include only those inputs and outputs mentioned above. Once the processor 104 has received the inputs, the processor 104 may perform a calculation, or may consult a lookup table to determine the amortization period. For example, the mortgage constant may be calculated according to one of the following equations:

To determine the number of years, the answer is rounded to the nearest whole number:

$$((\ln(C/(C-INT))/\ln(1+(INT/12)))/12, \text{ if } 30/360 \qquad (\text{eqn. 9})$$

$$((\ln(C/(C-INT))/\ln(1+(INT/12)))/11.8275154004, \text{ if actual}/360 \qquad (\text{eqn. 10})$$

where C=mortgage rate constant (in decimal format, e.g., 0.01);
INT=interest rate (in decimal format; e.g. 0.01)
To determine the number of months, the answer is rounded to the nearest whole number (a negative number may be deducted from the number of years, above):

$$12*((((\ln(C/(C-INT)))/(\ln(1+(INT/12))))/12)-\text{round}\ (((\ln(C/(C-INT)))/(\ln(1+(INT/12))))/12)), \text{ if } 30/360 \qquad (\text{eqn. 11})$$

$$12*((((\ln(C/(C-INT)))/(\ln(1+(INT/12))))/11.8275154004)-\text{round}\ (((\ln(C/(C-INT)))/(\ln(1+(INT/12))))/12)), \text{ if actual}/360 \qquad (\text{eqn. 12})$$

where C=mortgage rate constant (in decimal format, e.g., 0.01);
INT=interest rate (in decimal format; e.g. 0.01)
According to certain embodiments system 100, once the user has selected or accessed one of the four modes using the graphical user interface 200 and entered an input using one or more of the inputs for that mode or interface, the system 100 will ensure that the user will return to that mode modified according to those inputs if the program is exited and then subsequently activated, or even if the user simply accesses one of the other modes before returning to the mode in which certain inputs were used. For example, if the user activates the program, uses the interface 200 to access the monthly payment mode, enters values for the loan amount, amortization period and interest rate using the inputs 222, 224, 226, and then exits the program, the system 100 will enter the monthly payment mode with those values already entered at the inputs 222, 224, 226 upon subsequent activation of the program. According to certain embodiments, the same would be true if the user accessed the monthly payment mode, entered certain values using the inputs 222, 224, 226, entered the interest rate mode, and then reentered the monthly payment mode, for example. The state information for the mode may be stored locally (e.g., at the local processor 104), may be stored remotely (e.g., at the remote processor 112) and/or both. According to other embodiments of the system 100, the values previously entered by the user may be reset to a default value each time the user subsequently activates or enters the mode (which default values may be changed at any time). The system 100 may also include an "undo" feature that permits the user to reset the inputs to a previous state if the inputs are changed by the user or are changed automatically, for example, in response to a request submitted by the user to reset to the default values.

Figure 8:
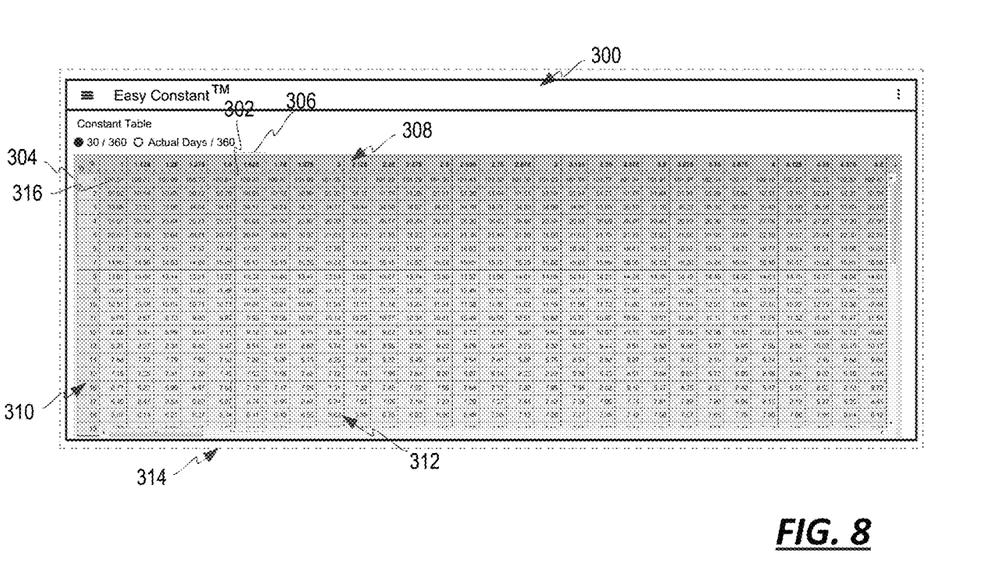
FIG. 8 is a simulated screenshot of a graphical element with a moveable window according to an embodiment of the specialized calculator.

As mentioned previously, the graphical user interface 200 may also permit access to additional modes. As one example, a chart mode may be provided (see 210 in FIG. 2). The chart mode may include a graphical element 300, as is illustrated in FIG. 8, the graphical element 300 including a plurality of cells 302 arranged in a plurality of rows 304 (one of which is highlighted in FIG. 8 with a phantom boundary) and columns 306 (one of which also is highlighted in FIG. 8 with a phantom boundary). In turn, each of the cells 302 may contain a numeric or alphanumeric character, although in some embodiments one or more of the cells 302 may be empty, blank or contents-free.

The exact nature of the contents of the cells 302 may vary based on the identification of the row or column in which that cell 302 appears. For example, as illustrated in FIG. 8, the cells 302 in the topmost row 308 and the leftmost column 310 (as designated according to the orientation illustrated in FIG. 8 for ease of discussion, and not by way of limitation) have a different purpose than the remainder of the cells 302. The topmost row 308 may be referred to as a header row 308, and the leftmost column 310 may be referred to as a header column 310. According to the illustrated embodiment, the header row 308 includes discrete instances of interest rates, and the header column 310 includes discrete instances of time periods (e.g., years). The increments by which interest rates and/or time periods vary may be determined by the user according to certain embodiments, by the provider of the calculator according to other embodiments. The header row 308 and header column 310 may be visually different than the other rows 304 and columns 306 to further set the header row 308 and header column 310 apart; for example, the contents of the cells 302 in the header row 308 and header column 310 may be bolded or the cells 302 may have a contrasting color.

The graphical element 300 may include a moveable window 312 in which an area of the graphical element 300 is visible. The window 312 may be moveable relative to the rows 304 and columns 306 of the graphical element 300 to display a different range of rows 304, a different range of columns 306 or a different range of rows 304 and a different range of columns 306 on the electronic display 106 in response to a first user input. According to the embodiment illustrated in FIGS. 8-13, different portions of the moveable window 312 may operate differently. That is, the cells 302 other than those in the topmost row 308 and the leftmost column 310 may move relative to the topmost row 308 and the leftmost column 310 both horizontally (either left or right), vertically (either up or down) or a combination of horizontally or vertically (e.g., at a diagonal). On the other hand, the cells 302 in the topmost row 308 may be confined to move only horizontally and in the leftmost column 310 may be confined to move only vertically.

As such, the user may use the moveable window 312 to view sections of the graphical element 300 that are not visible within a display area 314 of the electronic display 106. The display area 314 is represented by a dashed line about the graphical element 300 in FIG. 8. In fact, the display area 314 of the electronic display 106 may be demarked by a boundary formed from an edge or lip of the housing 116. Alternatively, the display area 314 may be determined by the size of the electronic display 106 used. In certain instances, the display area 314 may be well defined, in other instances, it may be difficult to determine visually where the display area 314 ends. Those portions of the graphical element 300 not visible in the display area 314 may be suggested to the user by permitting the graphical element 300 to show a partial row or a partial column (as in FIG. 8), thereby suggesting the continuation of the graphical element 300 beyond the display area 314. According to other embodiments, the fact that the graphical element 300 extends beyond the display area 314 may be inferred by the user based on the fact that the header row 308 and/or header column 310 do not include all of the increments that the user is otherwise informed or knows to be part of the range of interest rates or time periods represented by the graphical element 300. Other options are possible.

It will be recognized that where the graphical element 300 is much larger than the display area 314, it may be possible for a particular cell 302 to move relative to the header row and header column such that the particular cell is no longer visible in the display area 314. For example, where the graphical element 300 is as illustrated in FIG. 8, a cell 316 in the second row and second column (i.e., the cell 302 corresponding to an interest rate of 1% and a term of 1 year, with contents of "100.54" representing the corresponding mortgage constant) may appear to move behind the header row 308 and column 310 if the moveable window 312 is advanced in the direction of the lower right corner. Compare FIGS. 8 and 10. The user may be able to realize that a cell is no longer visible based on a comparison of the cells 302 in the header row 308 and header column 310, but locating a particular cell 302 may be difficult, particularly where a cell of interest is in a region of the graphical element 300 not visible when the moveable window 312 is moved to one of its extreme positions (e.g., the leftmost upper corner is visible).

According to the present disclosure, the at least one processor 104, 112 may be programmed to control the electronic display 106 to display an adjustable table with an adjustable, persistent frame of reference. This persistent frame of reference would continue to function, for example, to identify a particular cells or range of cells 302 even when the moveable window 312 has been manipulated so that the cell or range of cells is no longer visible in the display area 314 of the electronic display 106. As one example, the persistent frame of reference may identify a single cell 302, such as at the intersection of a row 304 and a column 306, or a range of cells 302, such as entire row 304 or an entire column 306.

The adjustable window and frame of reference may include the graphical element 300 and moveable window 312 mentioned above. One embodiment of the adjustable window and frame of reference may also include a first graphical user interface comprising a first control to select a cell from the plurality of cells, a row highlight responsive to the first control to maintain selection of a first row from the plurality of rows, the row comprising the cell, and a column highlight responsive to the first control to maintain selection of a first column from the plurality of columns, the column comprising the cell. It is also possible for the adjustable window and frame of reference to include only the row highlight or only the column highlight, in which case instead of having an adjustable frame of reference defined by a cell 302, the frame of reference may be defined by a plurality of cells 302.

Figure 9:
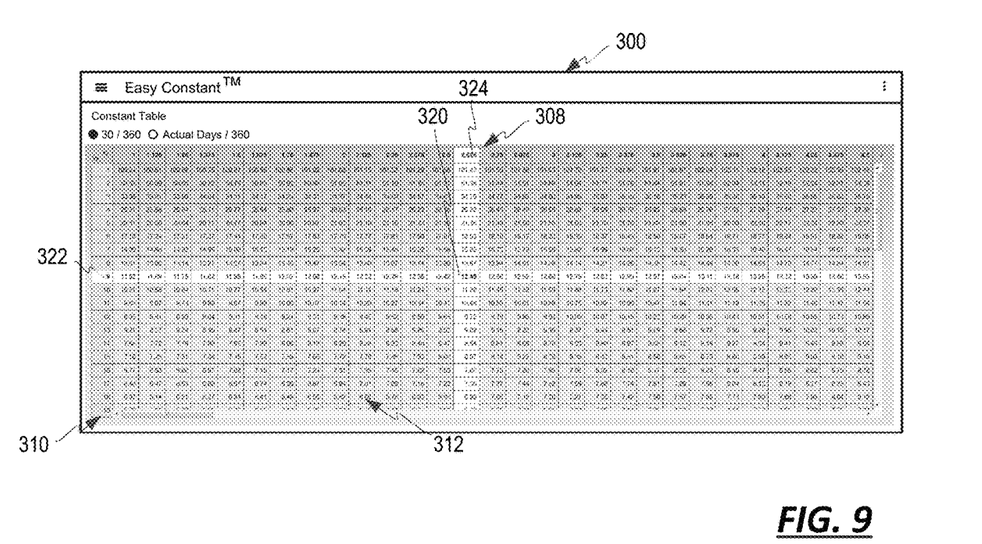
FIG. 9 is a simulated screenshot of the graphical element with moveable window of FIG. 8 in conjunction with a graphical user interface having row and column highlights.

According to the illustrated embodiment, the first control may be in the form of user input directed to the cell of interest. With reference to FIG. 9, the user input (which may be received by the processor 104 via a touchscreen 108 as one example) occurs within the cell of interest 320. The cell of interest 320 is located within a row 322 and a column 324. The user input of the cell of interest 320 thus causes the row and column highlights to be activated. Alternatively, the cell of interest 320 may be selected by selecting the row 322 and column 324 including the cell of interest 320, for example by selecting a cell 302 in the header row 308 or header column 310 corresponding to the column 324 or row 322 desired. The selection may also be deactivated, or cleared, by selecting the cell of interest 320 for a second time, or by selecting a point outside the graphical element 300.

FIG. 9 also provides an illustration of a first embodiment of the row highlight and the column highlight mentioned above. According to this embodiment, the row highlight comprises a change in the appearance of the row 322 relative to the other rows 304 of the graphical element 300, and the column highlight comprises a change in the appearance of the column 324 relative to the other columns 306 of the graphical element 300. According to certain embodiments, such as illustrated, the change in appearance of both the row highlight and the column highlight are the same; according to other embodiments, a different highlight may be used for the column highlight than for the row highlight. As illustrated, the row and column highlights involve a difference of color between for the row 322 and column 324 relative to the other rows 304 and columns 306. In particular, while the other rows 304 and columns 306 may be filled in gray, the row 322 and column 324 may be filled in white. For that matter, it may be considered that the row 322 and column 324 may in fact be transparent (no color) such that they permit the color of an underlying layer to be visible through the cells 302 of the row 322 and the column 324; for purposes of this application, this would still be considered to be a change in appearance involving a different color.

A number of alternative row and column highlights are possible. For example, one alternative highlight may be to bold the contents of rows within the selected row 322 and selected column 324 relative to other rows 304 and columns 306. Alternatively, the contents of the cells that are in the selected row 322 and/or selected column 324 that are also in the header row 308 and/or header column 310 may be bolded (where the contents of the header row 308 and header column 310 are not typically bolded). As a further alternative highlight, the row 322 and column 324 may be outlined in a thicker line weight than other rows 304 and columns 306. As a still further alternative, the cells 302 in the row 322 and column 324 may be filled in a different pattern (e.g., cross-hatching) than the cells 302 of the other rows 304 and columns 306. It will be recognized that any of the foregoing alternatives may also be combined with each other as a highlight (e.g., thicker line weight and a different color).

The cell of interest 320 may also have a highlight in combination with the row and column highlights mentioned previously. The cell of interest (COI) highlight may involve any one of the alternatives mentioned above relative to the row and column highlights, or other options as well. As illustrated in FIGS. 9-13, the COI highlight involves bolding the contents of the cell of interest 320.

Figure 10:
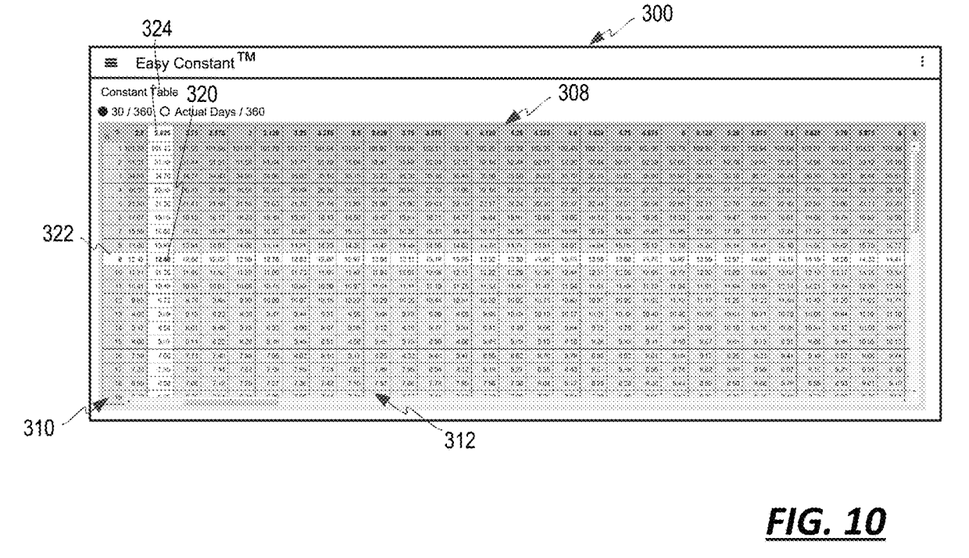
FIGS. 10-13 are simulated screenshots illustrating the graphical user interface with row and column highlights relative to the moveable window in several different positions for the window relative to the graphical element.
Figure 11:
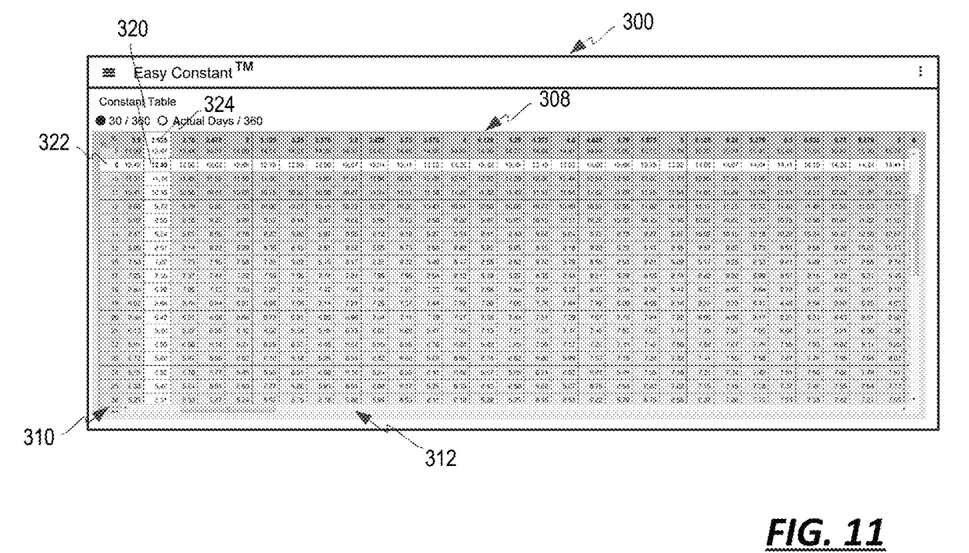
Figure 12:
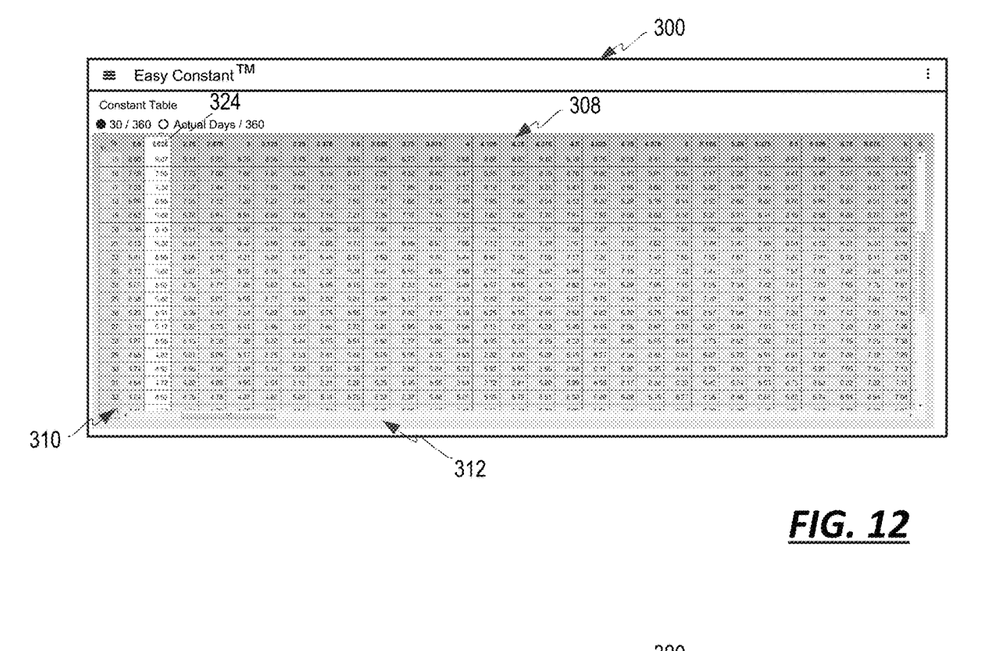
Figure 13:
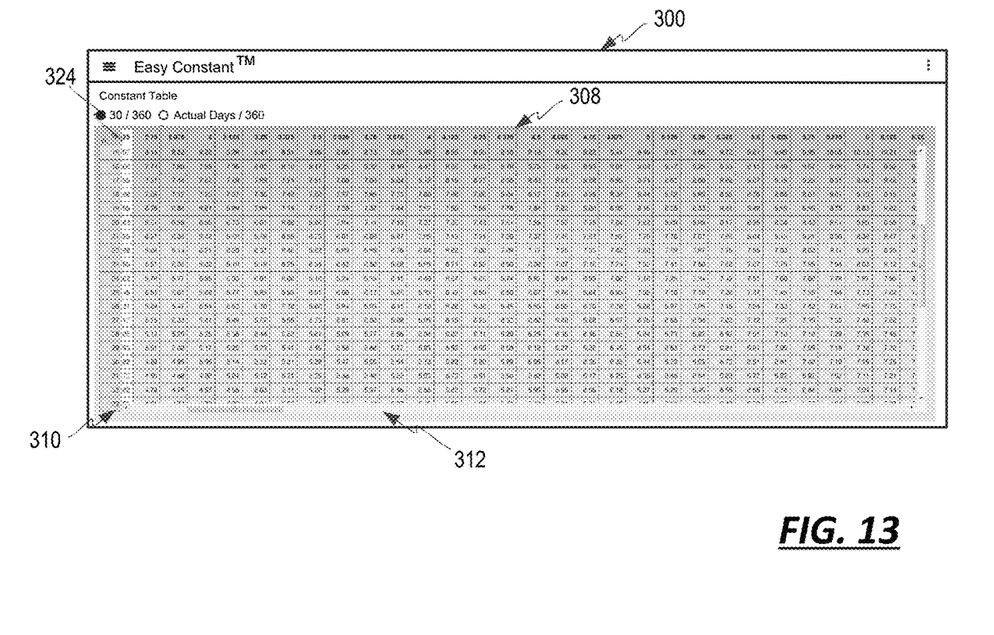

As reflected in FIGS. 10-13, the row highlight and column highlight maintain the selection of the cell of interest even with movement of the moveable window 312 relative to the graphical element 300. That is, FIG. 10 illustrates the motion of the moveable window 312 to the right of the position illustrated in FIG. 9. As the moveable window 312 shifts to the right, the cell of interest 320 appears to move to the left. With movement of the moveable window 312 downward from the position in FIG. 10, the cell of interest 320 appears to shift upward, as in FIG. 11. As seen in FIG. 12, with sufficient movement of the window 312 in the downward direction, the row highlight may no longer be visible; only the column highlight may be visible. With further movement of the window 312 to the right, the column highlight may also become less visible, as in FIG. 13, until it too is no longer visible.

However, according to the disclosed system 100, if one were to reverse the motion of the window 312 to the left, the column highlight would again become visible, as in FIG. 12. Furthermore, with additional movement of the window 312 upward, as in FIG. 11, the row highlight would again become visible. It is not necessary that the user reverse the motion of the window 312 in the same order that one did to cause the row and column highlights to be no longer visible so as to make the highlights visible once again. For example, the window could have been moved upward to first make the row highlight visible and then moved leftward to make the column highlight visible. The system 100 maintains the highlights for the selected row and column in a persistent fashion such that whichever order the motion is sequenced, the highlights are visible in the window 312 when any of the cells 302 of the row 322 and column 324 are visible in the window 312.

The row and column highlights have benefits beyond identifying a cell of interest 320. The row and column highlights also permit the user to locate the cell of interest visually 320, based on the highlight relative to the remainder of the graphical element 300, without the user having to focus on the contents of the individual cells 302. The user simply has to navigate the window 312 within the graphical element 300 until the row and/or column highlight appears, and then to navigate along the row or column highlight until the cell of interest 320 appears. As such, navigation within the graphical element 300 may be simplified, because navigation back to the cell of interest 320 does not require the user to read the contents of the cells 302, whether the individual cells 302 within the body of the window 312 or in a header row 308 and header column 310.

According to certain embodiments system 100, once the user has selected or accessed the chart mode using the graphical user interface 200 and activated the highlights for the row 322 and/or column 324, the system 100 will ensure that the user will return to that mode modified according to those highlights if the program is exited and then subsequently activated. For example, if the user activates the program, uses the touchscreen 108 to select a cell of interest 320, and then exits the program, the system 100 will enter the chart mode with a particular row 322 and column 324 highlighted according to the cell of interest 320 that was selected upon subsequent activation of the program. The state information for the mode and highlighting may be stored locally (at the local processor 104), may be stored remotely (at the remote processor 112) and/or both. According to other embodiments of the system 100, the highlighting may be removed each time the user subsequently activates or enters the mode.

Figure 14:
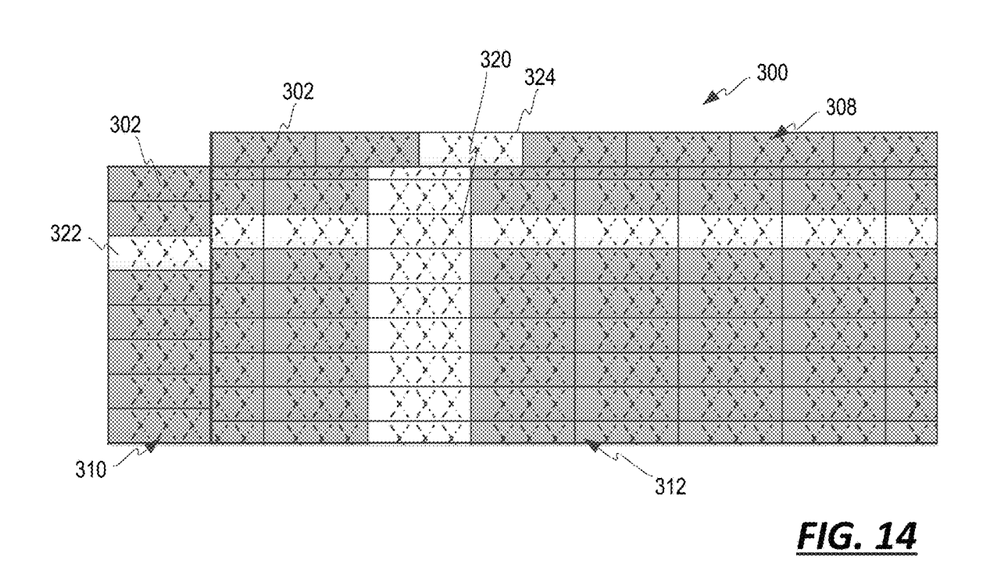
FIG. 14 is a simulated screenshot illustrating the row and column highlights in a header row and header column varying spatially relative to the row and column highlights in the remainder of a row or column of interest.
Figure 15:
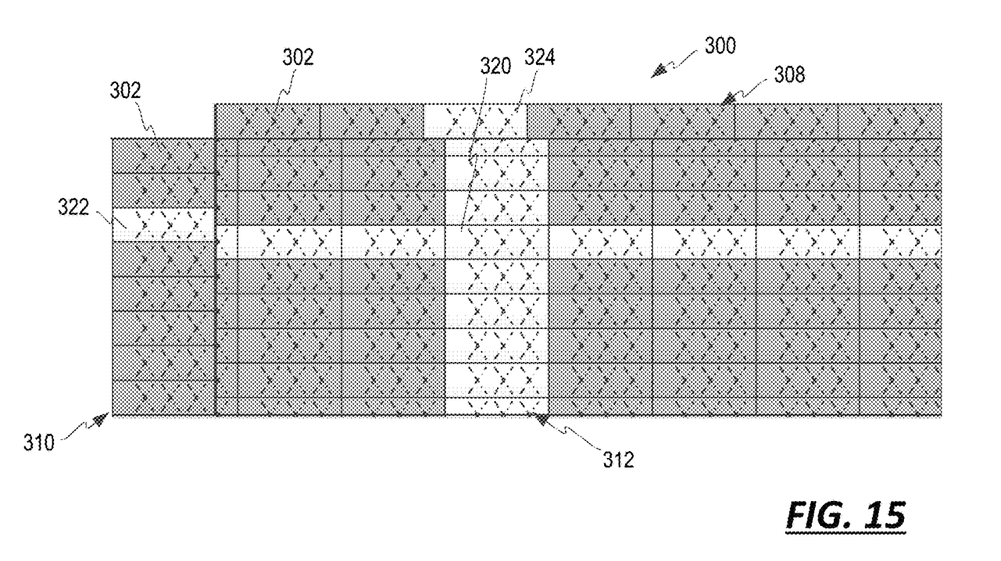
FIG. 15 is a simulated screenshot further illustrating the row and column highlights in the header row and the header column varying spatially relative to the row and column highlights in the remainder of a row or column of interest.

While the illustrations of FIGS. 9-13 illustrate the row and column highlights for the row 322 and column 324 associated with the cell of interest 320 being aligned for those cells 302 that are part of the header row 308 or header column 310 and those that are not, this need not be the case according to all embodiments, or at least not as to all operational states of all embodiments, e.g., all rates or speeds of movement. For example, as illustrated in FIGS. 14 and 15, the row and column highlights may vary spatially (e.g., no longer be aligned) between the cells 302 in the header row 308 and header column 310 and the remaining cells 302 within the row 322 and column 324 of interest (including cell of interest 320), even as the cells 302 in the header row 308 and the header column 310 may vary spatially (e.g., no longer be aligned) between the cells of the remainder of the graphical element 300 in the moving window 312. In particular, FIG. 14 illustrates how the highlights (and cells 302) may vary spatially with the displayed movement of the cell of interest 320 at a diagonal toward the upper left corner, and in FIG. 15 with the displayed movement of the cell of interest 320 at a diagonal toward the lower right corner. According to this embodiment, the cells 302 in the header row 308 and the header column 310 may appear to be offset from those of the remainder of the window for a given row or column, and the highlights in the header row 308 and header column 310 may also appear offset, as if to lag the motion of the remainder of the highlight visible in the moving window 312. This may be a helpful visual indicator of movement within the window 312 (or of the window 312).

While a particular offset is illustrated in FIGS. 14 and 15, it will be recognized that according to other embodiments (or even different operational states), the dimensions of the offsets may be less than or greater than those illustrated. Further, while diagonal movement has been illustrated in FIGS. 14 and 15 to aid in illustration of offsets both as to row and column, it will be appreciated that if the motion were directed parallel to the row 322 or the column 324 including the cell of interest 320, there may be no offset between the cells in the header row 308 or column 310 and the remainder of cells in the row 322 or column 324 (including the cell of interest 320). Specifically, if the motion were entirely to the left or right (with reference to the orientation of the graphical element 300 in FIGS. 14 and 15), there would be no offset between the cell 302 in the header column 310 and other cells of the row 322, but there would be an offset between the cell 302 in the header row 308 and the other cells of the column 324. Likewise, if the motion were entirely upwards or downwards, there would be no offset between the cells of the column 324, but there would be an offset between the cell 302 of the header column 310 and the remaining cells of the row 322. Further, while the offset has been illustrated as occurring between the cells of the header row 308 and column 310 and the remaining cells in the row 322 or column 324, the offset may occur at some other point along the row 322 or column 324 (e.g., closer to where the user input is received by an input device, such as a touchscreen). Thus, it may be sufficient that the row and column vary spatially at some point along the row 322 and column 324, even if the variations do not occur between the cells 302 of the header row 308 and/or the header column 310 and the remaining cells of the row 322 and/or column 324 (including the cell of interest 320) as in the illustrated embodiment of FIGS. 14 and 15.

Further, it will be recognized that while it may be desirable to navigate the graphical element 300 while maintaining the entire graphical element 300 in which to navigate (as in FIGS. 8-15), it may also be desirable to display a smaller portion of the graphical element 300 that is entirely visible within the display area 314. To this end, the specialized calculator according to the present embodiments may also include a second graphical user interface 340 comprising a second control (or controls) 342 to select a range of the rows 304 and a range of the columns 306 of the graphical element 300 to define a subset with a subset area smaller than a total area of the graphical element 300. The processor 104 may be configured or programmed to display the subset on the electronic display 106 during the chart mode and to discontinue the moveable window 312 if the subset area is smaller than the moveable window 312. The processor 104 may also be programmed to change or discontinue display of the subset in response to a third control.

According to the illustrated embodiment, the second graphical user interface 340 for selecting a subset of the graphical element 300 may be accessed from the graphical user interface 200 illustrated in FIG. 2. In particular, the graphical user interface 200 includes an area 212 to permit the user to use the input 108 to select the second graphical user interface 340, which is illustrated in FIG. 16.

Figure 16:
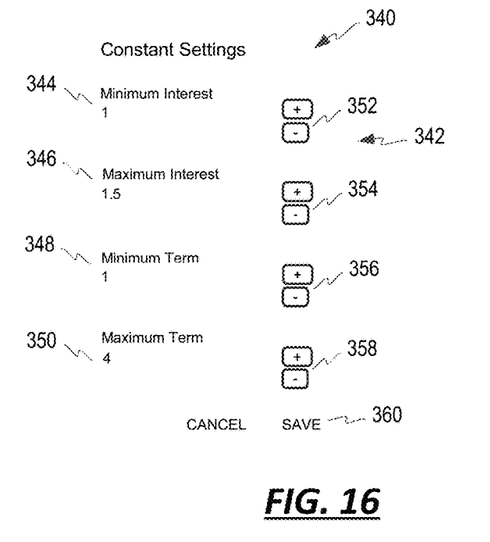
FIG. 16 is graphical user interface for selecting a subset of the graphical element of FIG. 8.

As illustrated in FIG. 16, the graphical user interface 340 may include a control 342 that has a plurality of control elements, each associated with a different section of the control 342. For example, according to the illustrated embodiment, the control 342 includes four areas, 344, 346, 348, 350, each having an input 352, 354, 356, 358. The first two inputs 352, 354 may be used to control the range of columns displayed, while the second two inputs 356, 358 may be used to control the range of rows displayed. As illustrated, the inputs 352, 354, 356, 358 are in the form of a pair of buttons that allow the user to increase or decrease a value that corresponds to one of the rows 304 or columns 306 in the graphical element 300. Other forms of control are possible, including an input that receives a numeric input from the user, via a touchscreen for example. The control 342 may also include an input 360 by which the user may indicate to the processor 104 that the user has completed his or her selection of the ranges.

Figure 17:
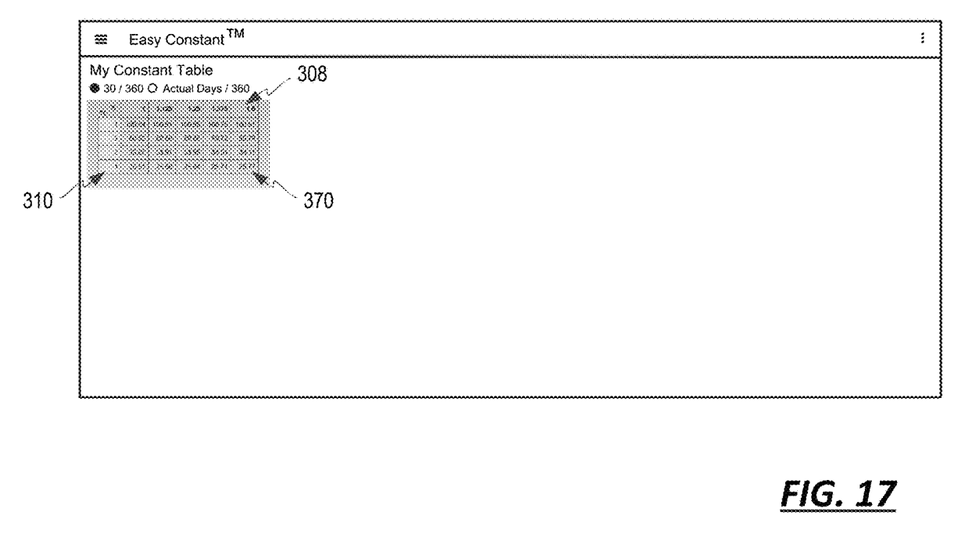
FIG. 17 is a simulated screenshot of the subset of the graphical element of FIG. 8 in accordance with the graphical user interface of FIG. 16.

In response to the user input received via the control 342, the processor 104 may cause the display 108 to display a subset 370 (see FIG. 17) having a subset area that is less than the total area of the graphical element 300. The subset 370 may include a header row 308 and a header column 310. In fact, while not illustrated, the subset may include the row and column highlights discussed above, although as the subset area is less than the moveable window 312, the moveable window has been discontinued by the processor 104. It will be recognized that where the subset area is greater than the moveable window 312, while still less than the total area of the graphical element 300, the moveable window 312 may continue to be used. The use of a subset may facilitate the navigation of the graphical element 300 by permitting the user to exclude portions of the graphical element 300 not relevant to their present focus or interest. In particular, the static nature of the display of the subset (relative to the movable window 312) may limit the chances that the particular region of interest within the graphical element 300 may disappear from view.

According to certain embodiments system 100, once the user has selected or accessed the chart mode using the graphical user interface 200 and used the controls 342 to select a subset of the graphical element 300, the system 100 will ensure that the user will return to the chart mode modified according to those inputs if the program is exited and then subsequently activated. For example, if the user activates the program, uses the interface 340 to access the chart mode, uses the controls 342, and then exits the program, the system 100 will enter the chart mode with those values already entered at the inputs 352, 354, 356, 358, 360 upon subsequent activation of the program. The state information for the mode may be stored locally (at the local processor 104), may be stored remotely (at the remote processor 112) and/or both. According to other embodiments of the system 100, the values previously entered by the user may be reset to a default value each time the user subsequently activates or enters the mode (e.g., the chart mode returns with the entire graphical element 300 displayed—or at least as much as may be displayed in the display area 312 of the electronic display 106).

It is believed that the aforementioned embodiments of the specialized calculator may have several benefits, one or more of which may be present in an embodiment according to the present disclosure. The specialized calculator eliminates the need to recall specific formulae, or the need to recall the inputs for those formulae, relative to calculations performed relative to a mortgage constant. The calculator focuses only on those inputs required from the user for the performance of a select group of calculations previously performed with respect to mortgage constant charts. As the same time, the calculator permits reference to the charts, and includes navigation tools that permit the charts to be used to maintain visually a region of interest, either when navigating the entire chart or by focusing on a region of interest.

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A portable specialized mortgage constant calculator comprising:
   an electronic display;
   at least one processor coupled to the electronic display; and
   at least one input coupled to the processor to provide one or more user inputs;
   the at least one processor being programmed to provide at least three different modes, each mode associated with a separate graphical user interface tailored to the mode and displayed on the electronic display, including:
   a first mode for calculation of a mortgage constant, the graphical user interface comprising an interest rate input and an amortization period input, and a mortgage constant output;
   a second mode for calculation of an interest rate, the graphical user interface comprising an amortization period input and a mortgage constant input, and an interest rate output; and
   a third mode for calculation of a period, the graphical user interface comprising an interest rate input and a mortgage constant input, and an amortization period output, and
   wherein the at least one processor is programmed to provide a further graphical user interface to permit the user to select among at least the first, second, and third modes, to receive an input from the user associated with the selection of one of the first, second, and third modes, to display only the graphical user interface tailored to the mode associated with the input, and to change to only the graphical user interface of another of the first, second, and third modes if another input from the user associated with the selection of another of the first, second, and third modes is received,
   wherein the at least one processor is further programmed to control the electronic display to display an adjustable table with an adjustable, persistent frame of reference, the adjustable table and adjustable frame of reference comprising:
   a graphical element comprising a plurality of cells arranged in a plurality of rows and a plurality of columns, each of the cells containing a numeric or alphanumeric character;
   a moveable window in which an area of the graphical element is visible, the window being moveable relative to the rows and columns of the graphical element to display a different range of rows, a different range of columns or a different range of rows and a different range of columns on the electronic display in response to a first user input;
   a first graphical user interface comprising a first control to select only a cell of interest from the plurality of cells, a row highlight responsive to the first control to maintain selection of a first row from the plurality of rows, the row comprising the cell, and a column highlight responsive to the first control to maintain selection of a first column from the plurality of columns, the column comprising the cell,
   the row highlight and column highlight being visible and moveable in two dimensions in the moveable window when any cell in the first row or the first column is visible within the moveable window and the row highlight and column highlight not being visible in the moveable window when cells in the first row or the first column are not visible within the moveable window; and
   a second graphical user interface comprising a second control to select a range of the rows and a range of the columns of the graphical element to define a subset with a subset area smaller than a total area of the graphical element, the processor programmed to display only the subset on the electronic display and to discontinue the moveable window if the subset area is smaller than the moveable window.

2. The portable specialized mortgage constant calculator according to claim 1, wherein each of the modes comprises a first calculation mode on a 30/360 basis and a second calculation mode on an actual days/360 basis, and each of the graphical user interfaces comprises a calculation mode input to select between the first and second calculation modes.

3. The portable specialized mortgage constant calculator according to claim 1, the at least one processor being programmed to provide a further mode for calculation of a payment, the graphical user interface comprising a loan amount input, an amortization period input, and an interest rate input and a payment output;

wherein the graphical user interface of the further mode includes a graphical element in tabular form that displays one or more of a payment amount, a portion of the payment attributable to interest, a portion of the payment attributable to principal repayment, a total interest paid to a specific point in time, a total principal paid to a specific point in time, and a total payment made to a specific point in time.

4. The portable specialized mortgage constant calculator according to claim 3, wherein the graphical element of the graphical user interface of the further mode is divided into a plurality of time increments, each time increment associated with a header row, and one of the header rows having a highlighting relative to the other header rows.

5. The portable specialized mortgage constant calculator according to claim 4, wherein the highlighting varies with movement of the header rows.

6. The portable specialized mortgage constant calculator according to claim 1, wherein each row is associated with a different amortization period and each column is associated with a different interest rate.

7. The portable specialized mortgage constant calculator according to claim 1, wherein the electronic display comprises a display area, the display area being smaller than the total area of the graphical element.

8. The portable specialized mortgage constant calculator according to claim 1, wherein the electronic display, at least one of the at least one processor and the at least one input are disposed in or mounted on a hand-held device.

9. The portable specialized mortgage constant calculator according to claim 8, wherein the hand-held device is a mobile or cellular device.

10. The portable specialized mortgage constant calculator according to claim 8, wherein at least one of the at least one processor is disposed external to the hand-held device.

* * * * *